May 25, 1965
R. W. HARMON
3,185,763
CORONA REDUCTION INCONDUCTOR CLAMPS FOR HIGH
VOLTAGE TRANSMISSION LINES
Filed March 18, 1963
3 Sheets-Sheet 1
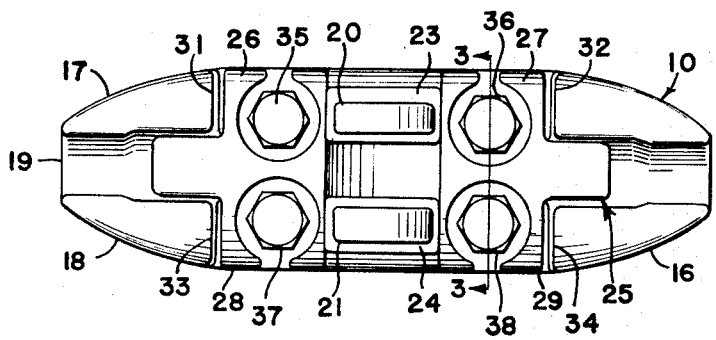
FIG.2
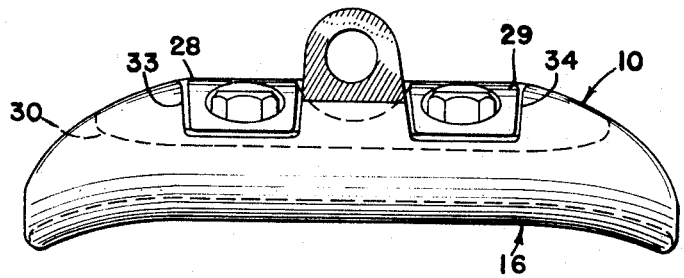
FIG. 1
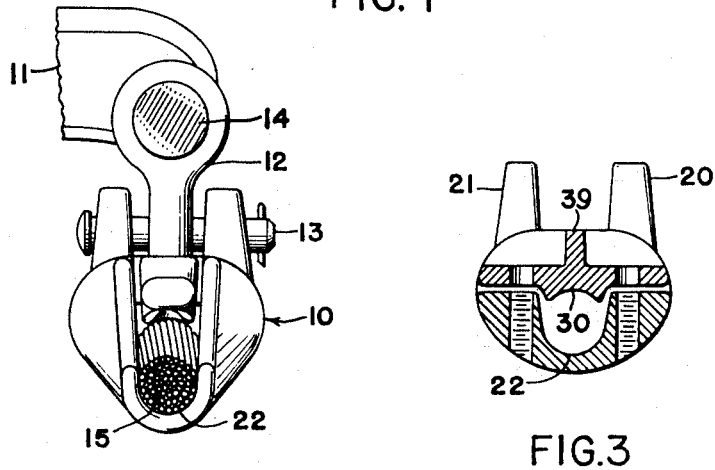
FIG.4
FIG.3
INVENTOR.
ROBERT W. HARMON
BY
Kenneth W. Miller
ATTORNEY May 25, 1965

R. W. HARMON 3,185,763

CORONA REDUCTION IN CONDUCTOR CLAMPS FOR HIGH VOLTAGE TRANSMISSION LINES

Filed March 18, 1963

TANGENT LINE OF CABLE

*INVENTOR.*
ROBERT W. HARMON
BY

ATTORNEY

May 25, 1965

R. W. HARMON 3,185,763

CORONA REDUCTION IN CONDUCTOR CLAMPS FOR HIGH
VOLTAGE TRANSMISSION LINES

Filed March 18, 1963

INVENTOR
ROBERT W. HARMON

BY Kenneth W. Miller

ATTORNEY

United States Patent Office 3,185,763
Patented May 25, 1965

3,185,763
CORONA REDUCTION IN CONDUCTOR CLAMPS
FOR HIGH VOLTAGE TRANSMISSION LINES
Robert W. Harmon, Doylestown, Ohio, assignor to The
Ohio Brass Company, Mansfield, Ohio, a corporation of
New Jersey
Filed Mar. 18, 1963, Ser. No. 266,469
9 Claims. (Cl. 174—144)

This invention relates to transmission lines and, more particularly, to clamps for transmission line conductors. This application is a continuation-in-part of application Serial No. 68,758, filed November 14, 1960, by Robert W. Harmon, and entitled Conductor Clamps, now abandoned.

The principal object of the invention is to increase the operating voltage of transmission lines.

Another object of the invention is to reduce corona effects in clamps for transmission line conductors.

The invention, together with further objects, features and advantages thereof, will be apparent from the following detailed specification and claims taken in connection with the appended drawings in which:

FIG. 1 is a side elevation view of a suspension clamp comprising a first embodiment of the invention;

FIG. 2 is a top plan view of the suspension clamp of FIG. 1;

FIG. 3 is a section view of the suspension clamp of FIG. 1, taken along the line 3—3 of FIG. 2;

FIG. 4 is a end view of the suspension clamp of FIG. 1 showing the clamp in relation to a conductor cable and a suspension plate for a bundle conductor;

Figure 6:
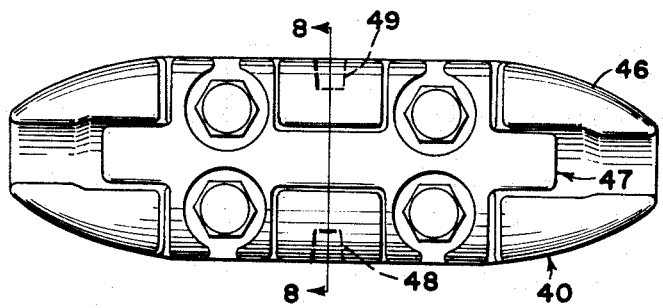
FIG. 6 is a top side view of the conductor clamp of FIG. 5.

In United States Patent 3,076,863, issued February 5, 1963, to R. W. Harmon and A. D. Lantz, there is shown and described a bundle conductor system for power transmission lines particularly useful for transmission at very high voltages. As set forth in that patent, a plurality of conductor cables are carried from a string of suspension insulators by means of a suspension plate which holds the conductor cables in transversely spaced relation. The conductor cables are so carried with respect to the suspension insulators that corona effects are minimized and the line voltage is divided uniformly between the several insulators.

In connection with development and testing of the invention of the above referenced patent, it was discovered that the corona characteristics of suspension clamps of then known design constituted a limiting factor in the operation of the line. The inherent voltage capability of the bundle conductor and suspension plate greatly exceeded that of the suspension clamp so that a corona discharge would be initiated about the suspension clamp at voltages much lower than voltages required to initiate corona discharge about the remaining parts. The conductor clamps shown and described herein embody new designs which have a corona limit substantially above that of clamps heretofore utilized in the industry.

Referring briefly to FIG. 4, the suspension clamp 10 of the invention is carried from an arm of a suspension plate 11 by means of a yoke 12 and pins 13 and 14 and holds the conductor cable 15. The arm constitutes an arc termination shield for the suspension clamp 10 and the cable 15 which is carried by the clamp. The clamp 10 is designed with large radii and smoothly rounded exterior surfaces, such that the tendency of the clamp to produce a corona discharge is substantially less than that of the suspension plate 11. The suspension plate 11 is the same as that shown in FIG. 2 of U.S. Patent 3,076,863, idem.

Referring now to FIGS. 1, 2 and 3, the clamp 10 of the invention is constituted by a unitary clamp body 16 having two side walls 17 and 18, a bottom wall 19, and two clevis arms 20 and 21. The side walls 17 and 18 have spaced interior parts to define, with the bottom wall 19, a seat 22 for the cable 15. The clevis arms 20 and 21 project from the body 16 along smooth tapered parts 23 and 24, all formed as an integral part of the body of the clamp. The side walls have thick central parts and taper smoothly along a convex exterior surface to the end parts of the clamp.

The bottom wall 19 and the seat 22 extend uniformly away from the clevis arms 20 and 21 in both longitudinal directions from the vertical center line through the pin 13 (shown in dotted outline in FIG. 1).

A keeper 25 is constituted as a unitary piece having laterally extending side pieces 26 and 27, and 28 and 29 for securing the keeper to the clamp body 16. The under side of the keeper 25 is formed with an arcuate face 30 which engages the cable along the top part of the body. The keeper has an arcuate disposition in the longitudinal direction so as to exert a clamping force upon the cable which varies as a function of the distance from the center line through the pin 13.

The side pieces 26 and 27 are received in openings 31 and 32 in the side wall 17 and the side pieces 28 and 29 are received in openings 33 and 34 though the side wall 18 arranged on opposite sides of the clevis arms 20 and 21 respectively. The keeper is drawn against the cable 15 and the side pieces are clamped against the side walls 17 and 18 by means of cap screws 35, 36, 37 and 38, referred to herein as bolt fasteners, which pass through openings in the side pieces 26 to 29, respectively, and are received in threaded openings in the side walls of the body 17 (see FIG. 3).

The exterior surfaces of the side pieces 26 to 29 are shaped to conform to the exterior surfaces of the body part 16 and to constitute a smooth continuation of the exterior surface of the body. The heads of the cap screws 35 to 38 are received in recesses in the exterior portions of the side pieces and the recesses are of a depth such that the heads of the cap screws are substantially within the equi-potential surface defined by the exterior surface of the body part and the side pieces. As will be evident from FIG. 1 and FIG. 3, the exterior surface 39 of the keeper has a convex aspect which is a continuation of the exterior surface of the clamp body in the circumferential direction. Accordingly, the clamp has a smooth and uniform exterior along the length and about the circumference thereof and there are no sharp discontinuities which might serve to initiate corona discharge.

The keeper 25 has an arcuate depression or recess in that part of the central bridge of the keeper piece below the pin 13 for accommodating the end of the yoke 12 (shown in dashed outline in FIG. 1). This arrangement accomplishes a desirable reduction in the distance between the pivot pin 13 and the cap 15 since the point of tangent intersection for the cable portions on the two sides of the clamp, due to the angle of arrival of the cable with respect to the horizontal at the ends of the clamp body, is close to the body of the cable at the central part of the clamp. Because of the arrangement of the keeper with the side pieces merged with the side walls of the clamp, the presence of the recess between the clevis arms does not affect the electrical characteristics of the clamp.

Reduction of the distance between the pin 13 and the cable minimizes the possibility of mechanical damage to the conductor cable under conditions of severe vibration and, additionally, brings the cable close to the suspension insulators with which the apparatus is utilized, as described in U.S. Patent 3,076,863, above referred to.

Figure 5:
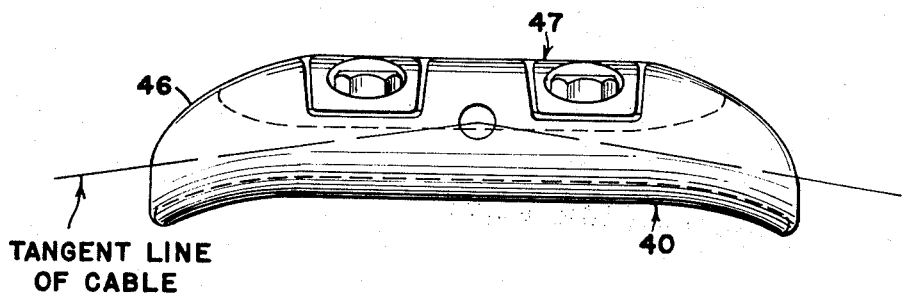
FIG. 5 is a side elevation view of a conductor clamp comprising a second embodiment of the invention.
Figure 7:
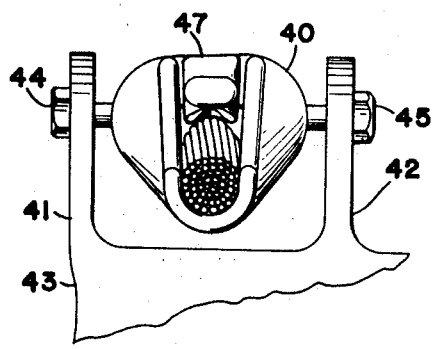
FIG. 7 is an end view of the conductor clamp of FIG. 5 showing the clamp in relation to a conductor cable and a support plate therefor.
Figure 8:
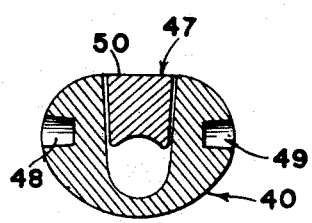
FIG. 8 is a sectional view taken in the direction 8—8 in FIG. 6.
Figure 10:
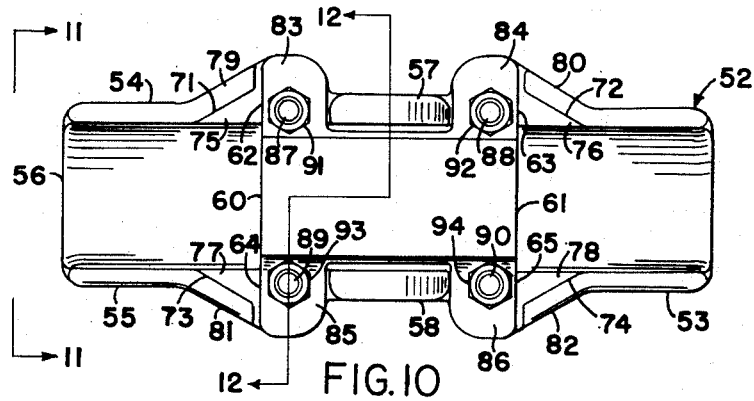
FIG. 10 is a top view of the conductor clamp of FIG. 9.

Referring now to FIGS. 5, 6 and 7, there is shown a conductor clamp embodying the invention and useful in connection with a bundle conductor apparatus as shown in United States Patent 3,076,864, issued February 5, 1963, to R. W. Harmon and A. D. Lantz.

As shown particularly in FIG. 7, the conductor clamp 40 is carried upon two stanchion arms 41 and 42 of a support plate 43. The clamp 40 is pivoted upon two studs 44 and 45 which are threaded through the stanchion arms 41 and 42 and are received in openings in the side walls of the conductor clamp.

The clamp body 46 comprises a unitary part having the same design and exterior shape as the clamp body 16 of the suspension clamp of FIGS. 1 and 2. A keeper 47 having the same design and shape as the keeper 25 of FIGS. 1 and 2 is received between the side walls and in side openings of the side walls of the clamp body 46. The side walls of the clamp body have circular recesses 48 and 49 for receiving the ends of the studs 44 and 45. The walls of the recesses 48 and 49 and the inner extremity of the studs 44 and 45 may be suitably tapered to provide a stable clamping action which resists wear due to the relative movement of the parts.

The central part of the body 46 and keeper 47 has a smooth rounded exterior and the bridge 50 of the keeper 47 is a smooth extension of the elongate part of the keeper, and is flush with the center part of the body of the clamp.

The arrangement of FIG. 7 is advantageous in that the recesses 48 and 49 are located at the point of tangent intersection of the conductor cable at the ends of the clamp.

In FIG. 9 to FIG. 12 inclusive, the suspension clamp 52 is constituted as a unitary clamp body 53 having side walls 54 and 55, a bottom wall 56, and two clevis arms 57 and 58. The side walls 54 and 55 have spaced interior portions and the bottom wall has an arcuate interior surface 59 to constitute a seat for accommodating a conductor cable extending longitudinally through the clamp.

A keeper 60 is constituted as a unitary elongate clamp piece 61 having laterally extending sides pieces 62 and 63 and 64 and 65 for securing the keeper to the body 53. The clamp piece 61 has the interior portion thereof formed with an arcuate surface 66 to constitute a seat for engaging the cable conductor.

The clamp body 53 is constituted with recesses 71, 72, 73 and 74 in the laterally disposed portions of the side walls in opposite longitudinal directions from the two clevis arms 57 and 58. As will be evident, particularly from FIG. 10 and FIG. 12, the recesses 71 to 74 are constituted by horizontally extending portions 75, 76, 77 and 78 of the side walls 54 and 55 and shield parts 79 to 82 of the clamp body extending laterally outward from the aligned parts of the walls of the body. The side pieces 62 to 65 of the keeper 60 are received in the recesses 71 to 74, and the ends of the side pieces of the keeper are shaped to control the distribution of electrostatic stresses in the vicinity of the keeper. The ends of the side pieces, referred to separately as shield parts 83 to 86 of the keeper, thereby shield the side pieces and the extremities of the bolt fasteners 87 to 90 and the screw means or nuts 91 to 94 against excessive stresses and minimize corona formation, that is, increase the voltage of incipient corona.

The shield parts 83 to 86 of the keeper 60 cooperate with the shield parts 79 to 82 of the clamp body 52 to assure proper stress control in the region adjacent the side pieces of the keeper and the side walls of the clamp body. To this end, the shield parts 79 to 82 of the clamp body extend outward from the side walls of the body to the lateral extremity of the shield parts of the keeper, merging smoothly with the walls of the body and extending closely adjacent the shield parts of the keeper. The adjacent portions of the shield parts have the exterior surfaces disposed in substantially tangent relation and the extremities of the surfaces of each part are smoothly rounded to minimize corona formation. The tangent relation between the surfaces of the respective shield parts and the rounding of the extremities of the parts will be evident from FIG. 10, which particularly shows those features for the longitudinal direction of the clamp, and from FIG. 11, which particularly shows those features for the circumferential direction of the clamp. The closely fitted, mechanically smooth arrangement of the parts leads to electrical smoothness and freedom from corona.

Figure 9:
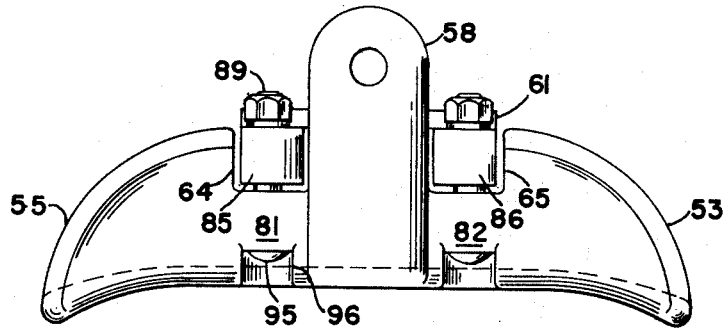
FIG. 9 is a side elevation view of a conductor clamp comprising another embodiment of the invention.
Figure 11:
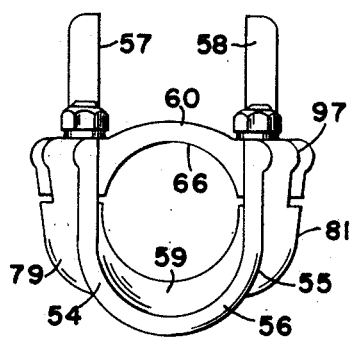
FIG. 11 is an end view of the conductor clamp of FIG. 9.
Figure 12:
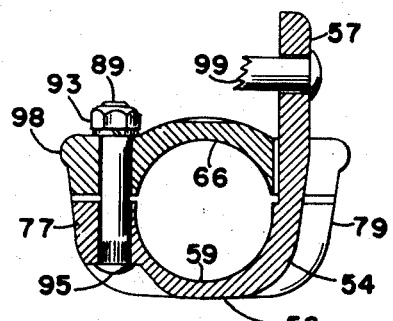
FIG. 12 is a sectional view of the clamp of FIG. 9, taken in the direction 12—12 in FIG. 10.

The bolts 87 to 90 are received through openings in the horizontally extending portions 75 to 78 inclusive of the side walls, illustrated for the portion 77 of the side wall 55 in FIG. 12. The heads of the bolts are received in recesses formed on the under side of the horizontal portions of the side walls and defined by the outwardly extending portions of the shield parts 79 to 82 on the under side of the side pieces and shield parts of the keeper 60. As illustrated in FIG. 9 and FIG. 12 for the bolt 89, the head 95 of the bolt is disposed within the recess 96 defined by the shield part 81, particularly that portion below the part 85 of the keeper, and the adjacent portions of the bottom wall 56 and the side wall 55 of the clamp body. The top extremities of the side walls 54 and 55, the shield parts 79 to 82 of the clamp body, and the shield parts 83 to 86 of the keeper are formed with smoothly rounded surfaces, indicated at 97 for the top extremity of the wall 55 and indicated at 98 for the shield part 85, to minimize corona formation and augment the shielding effect generally.

The clevis arms 57 and 58 are integral with the clamp body and have the surfaces thereof formed as smooth continuations of the surfaces of the side walls 54 and 55 of the clamp body and are positioned between the associated shield parts of the clamp body and keeper. The outwardly extending portions of the shield parts function to minimize electric stresses along the edges of the clevis arms 57 and 58 and the associated hardware, e.g., the pin 99. The corners and surfaces of the clevis arms and the merging portions of the arms and body and shield parts are made as smooth as possible.

Conductor clamps constructed in accordance with the invention have been operated to voltages in excess of 500 kv., line to line voltage, without substantial corona or radio noise.

It is to be understood that the foregoing description is not intended to restrict the scope of the invention and that various rearrangements of the parts and modifications of the design may be resorted to. The following claims are directed to combinations of elements which embody the invention or inventions of this application.

I claim:

1. A conductor clamp comprising an elongate clamp body having a longitudinal cable-receiving groove defined by a bottom wall and spaced side walls, means on the walls at the central part of the body for carrying the clamp from an associated structural part, recesses in the top parts of the side walls, a keeper received in the cable groove and comprising an elongate member having laterally extending side pieces extending through the recesses to the exterior thereof, and means securing the keeper to the side walls of the body comprising a plurality of bolt fasteners, each extending vertically through one of the side pieces and into the wall of the clamp body, the extremities of the bolt fasteners being received in recesses in the side pieces and in the adjacent portions of the side walls, the side pieces being substantially flush with the side walls along the top and side extremities thereof and the side pieces having smooth closely spaced tangently related adjacent exterior surfaces for minimizing corona formation therefrom.

2. A conductor clamp comprising an elongate clamp body having a longitudinal cable-receiving groove constituted by a bottom wall and spaced side walls, a keeper in the cable groove comprising an elongate member having a seat on the interior surface thereof opposed to a cable seat on the interior surface of the bottom wall of the clamp body, two pairs of side pieces on the keeper extending transversely outward from the body of the keeper and into recesses in the side walls of the clamp body, the side pieces extending in opposite transverse directions of the clamp body and through the side walls of the clamp body to the exterior thereof, means securing the keeper to the side walls of the clamp comprising a plurality of bolt fasteners, each extending vertically through one of the side pieces and into the wall of the clamp body and the lower extremities of the fasteners being received in recesses in the body, means at the top extremities of each of the fasteners electrically shielding the extremities of the fasteners, the side pieces of the keeper being substantially flush with the side walls along the top and side extremities thereof and the adjacent portions of the side pieces and the side walls having smooth closely spaced tangently related adjacent exterior surfaces for minimizing corona formation therefrom.

3. A conductor clamp in accordance with claim 2, in which the top extremities of the bolt fasteners are received in recesses on the top sides of the side pieces of the keeper and the clamp body and keeper form a smooth convex exterior surface in the circumferential direction of the clamp.

4. A conductor clamp in accordance with claim 2, in which the extremities of the side pieces of the keeper extend outwardly from the bolt fasteners and have smoothly rounded side surface portions thereof to comprise shield parts for shielding the extremities of the fasteners, and outwardly extending shield parts on the exterior of the side walls of the clamp body having the surfaces thereof merging smoothly with the exterior side and bottom surfaces of the clamp body and extending closely adjacent to the extremities of the keeper.

5. A conductor clamp in accordance with claim 4, in which the adjacent surface portions of the shield parts of the keeper and of the clamp body have substantially the same tangent directions.

6. A suspension clamp for line conductors comprising an elongate clamp body having a longitudinal cable-receiving groove constituted by a bottom wall and spaced side walls, a keeper in the cable groove comprising an elongate member having a seat on the interior surface thereof opposed to a cable seat on the interior surface of the bottom wall of the clamp body, side pieces on the keeper extending transversely outward from the body of the keeper and into recesses in the side walls, means securing the keeper to the clamp body comprising a plurality of bolt fasteners extending vertically through the side pieces and into the side walls, the bolt fasteners being received in openings extending vertically through the side walls to the exterior of the clamp body at the lower part of the body, means at the lower part of the body electrically shielding the lower extremities of the fasteners, and means at the upper part of the body electrically shielding the side pieces and the upper extremities of the fasteners, each of the extremities of the fasteners having an associated shielding means, all for corona-free electrification of the clamp at voltages to at least 500 kv.

7. A suspension clamp in accordance with claim 6, in which the first-named electrically shielding means comprises adjacent portions of the clamp body about each opening at the lower part of the body, the exterior surfaces of the said adjacent portions of the clamp body being disposed outwardly from the fastener extremity and smoothly rounded and tangently related in the circumferential and longitudinal directions of the clamp body.

8. A suspension clamp in accordance with claim 6, in which the upper extremities of the bolt fasteners are received in recesses in the side pieces, and the last-named electrically shielding means comprises adjacent portions of the side pieces about the recesses in the side pieces and of the clamp body about the side wall recess, the exterior surfaces of the said adjacent portions being smoothly rounded and tangently related in the circumferential and longitudinal directions of the clamp body.

9. A suspension clamp in accordance with claim 6, in which the last-named electrically shielding means comprises portions of the side pieces extending outwardly through recesses in the side walls, the said side pieces extending beyond the fasteners a substantial distance, and means comprising portions of the side walls having the exterior surfaces, thereof in closely spaced smoothly rounded tangent relation with the exterior surfaces of the side pieces.

References Cited by the Examiner
UNITED STATES PATENTS

| 1,997,627 | 4/35 | Casey | 174—73 X |
| 2,699,462 | 1/55 | Exner | 174—73 X |

FOREIGN PATENTS

| 595,467 | 4/34 | Germany. |
| 900,365 | 12/53 | Germany. |

OTHER REFERENCES

German printed application 1,061,404, Bergner, July 16, 1959.

LARAMIE E. ASKIN, *Primary Examiner.*

JOHN P. WILDMAN, *Examiner.*